United States Patent
Chang et al.

(10) Patent No.: US 8,918,051 B1
(45) Date of Patent: Dec. 23, 2014

(54) METHOD AND APPARATUS FOR PERFORMING A HANDOFF OF A DATA COMMUNICATION SESSION FROM ONE NETWORK TO ANOTHER NETWORK

(75) Inventors: Lu Chang, Cupertino, CA (US); Paul A. Lambert, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 761 days.

(21) Appl. No.: 12/699,416

(22) Filed: Feb. 3, 2010

Related U.S. Application Data

(60) Provisional application No. 61/253,806, filed on Oct. 21, 2009.

(51) Int. Cl.
*H04B 7/00* (2006.01)

(52) U.S. Cl.
USPC .......... 455/41.2; 455/41.1; 455/41.3; 455/59; 455/142; 455/143

(58) Field of Classification Search
USPC ................. 455/41.1, 41.2, 41.3, 59, 142, 143
See application file for complete search history.

(56) References Cited

U.S. PATENT DOCUMENTS

| | | | |
|---|---|---|---|
| 5,738,583 A | 4/1998 | Comas et al. | |
| 6,272,120 B1 | 8/2001 | Alexander | |
| 6,600,726 B1 | 7/2003 | Nevo et al. | |
| 6,690,935 B1 | 2/2004 | Calot et al. | |
| 6,704,866 B1 | 3/2004 | Benayoun et al. | |
| 6,707,801 B2 | 3/2004 | Hsu | |
| 6,760,587 B2 | 7/2004 | Holtzman et al. | |
| 6,785,892 B1 | 8/2004 | Miller | |
| 6,788,675 B1 | 9/2004 | Yang | |
| 6,793,580 B2 | 9/2004 | Sinclair et al. | |
| 6,795,701 B1 | 9/2004 | Baker et al. | |
| 6,799,056 B2 | 9/2004 | Curley et al. | |
| 6,834,192 B1 * | 12/2004 | Watanabe et al. | 455/444 |
| 6,859,460 B1 | 2/2005 | Chen | |
| 6,879,574 B2 | 4/2005 | Naghian et al. | |
| 6,879,812 B2 | 4/2005 | Agrawal et al. | |
| 6,909,705 B1 | 6/2005 | Lee et al. | |
| 6,932,698 B2 | 8/2005 | Sprogis | |
| 7,013,391 B2 | 3/2006 | Herle et al. | |
| 7,072,323 B2 | 7/2006 | Roberts et al. | |
| 7,073,129 B1 | 7/2006 | Robarts et al. | |
| 7,097,562 B2 | 8/2006 | Gagner | |
| 7,181,544 B2 | 2/2007 | Vangal et al. | |
| 7,224,964 B2 | 5/2007 | Souissi et al. | |

(Continued)

OTHER PUBLICATIONS

U.S. Appl. No. 11/542,396, filed Oct. 2006, Saund et al (Continued)

*Primary Examiner* — Wen Huang

(57) ABSTRACT

A mobile device includes a first interface module, a second interface module, and a control module. The first interface module is configured to interface the mobile device to a first wireless network and to receive data from a transmitting device via the first wireless network. The second interface module is configured to interface the mobile device to a second wireless network. The control module is configured to determine based on the data received when to switch a link to the transmitting device from the first wireless network to the second wireless network. The control module is further configured to transmit a message that informs the transmitting device not to transmit the data to the mobile device via the first wireless network in response to the link being switched to the second wireless network.

12 Claims, 5 Drawing Sheets

(56) References Cited

U.S. PATENT DOCUMENTS

| | | | |
|---|---|---|---|
| 7,236,772 B1 | 6/2007 | Botzas | |
| 7,251,235 B2 | 7/2007 | Wentink | |
| 7,308,263 B2 | 12/2007 | Gallagher et al. | |
| 7,324,444 B1 | 1/2008 | Liang et al. | |
| 7,400,722 B2 | 7/2008 | Qi et al. | |
| 7,440,430 B1* | 10/2008 | Jagadeesan et al. | 370/331 |
| 7,452,278 B2 | 11/2008 | Chen et al. | |
| 7,711,369 B2* | 5/2010 | Famolari | 455/442 |
| 8,218,499 B2* | 7/2012 | Lecompte | 370/331 |
| 2002/0151366 A1 | 10/2002 | Walker et al. | |
| 2002/0191560 A1 | 12/2002 | Chen et al. | |
| 2002/0199124 A1 | 12/2002 | Adkisson | |
| 2003/0069018 A1 | 4/2003 | Matta et al. | |
| 2003/0182454 A1 | 9/2003 | Huth et al. | |
| 2003/0231625 A1 | 12/2003 | Calvignac | |
| 2004/0063458 A1* | 4/2004 | Hori et al. | 455/554.2 |
| 2004/0066751 A1 | 4/2004 | Tseng et al. | |
| 2004/0105415 A1 | 6/2004 | Fujiwara et al. | |
| 2004/0127277 A1 | 7/2004 | Walker et al. | |
| 2004/0137901 A1* | 7/2004 | Hamasaki et al. | 455/436 |
| 2004/0174829 A1 | 9/2004 | Ayyagari | |
| 2004/0185851 A1 | 9/2004 | Nagai | |
| 2004/0196808 A1 | 10/2004 | Chaskar et al. | |
| 2005/0025163 A1* | 2/2005 | Christie | 370/401 |
| 2005/0032577 A1 | 2/2005 | Blackburn et al. | |
| 2005/0041660 A1 | 2/2005 | Pennec et al. | |
| 2005/0073980 A1 | 4/2005 | Thomson et al. | |
| 2005/0099977 A1 | 5/2005 | Williams et al. | |
| 2005/0157661 A1 | 7/2005 | Cho | |
| 2005/0177639 A1 | 8/2005 | Reunamaki et al. | |
| 2005/0181872 A1 | 8/2005 | Acharya et al. | |
| 2005/0197189 A1 | 9/2005 | Schultz | |
| 2005/0250487 A1 | 11/2005 | Miwa et al. | |
| 2005/0250497 A1 | 11/2005 | Ghosh et al. | |
| 2005/0268003 A1 | 12/2005 | Wang et al. | |
| 2005/0286456 A1 | 12/2005 | McNew et al. | |
| 2006/0041750 A1 | 2/2006 | Carter et al. | |
| 2006/0045138 A1 | 3/2006 | Black et al. | |
| 2006/0135262 A1 | 6/2006 | Kennedy et al. | |
| 2006/0205409 A1 | 9/2006 | Chiou et al. | |
| 2006/0268711 A1 | 11/2006 | Doradla et al. | |
| 2007/0047547 A1 | 3/2007 | Conner et al. | |
| 2007/0060355 A1 | 3/2007 | Amaitis et al. | |
| 2007/0060358 A1 | 3/2007 | Amaitis et al. | |
| 2007/0076683 A1 | 4/2007 | Chung | |
| 2007/0086394 A1 | 4/2007 | Yamada et al. | |
| 2007/0099703 A1 | 5/2007 | Terebilo | |
| 2007/0202910 A1 | 8/2007 | Brewer et al. | |
| 2008/0039015 A1 | 2/2008 | Nakata et al. | |
| 2008/0069105 A1 | 3/2008 | Costa et al. | |
| 2008/0095112 A1 | 4/2008 | Wiemann et al. | |
| 2009/0191878 A1 | 7/2009 | Hedqvist et al. | |
| 2011/0026494 A1* | 2/2011 | Nagasawa et al. | 370/332 |

OTHER PUBLICATIONS

U.S. Appl. No. 11/542,396 filed Jun. 2007, Chang et al.

Meredith, John; "Voice Call Continuity in 3GPP"; CompactPCI and AdvancedTCA systems; Apr. 2006; 2 pages.

"Universal Mobile Access: UMA Expands Beyond Dual-Mode Handsets"; The UMA Company; Jan. 2007; 8 pages.

Harry Newton, Newton's Telecom Dictionary, 1999, Miller Freeman Inc., 15th Edition, 762.

IEEE Standards Board. "Part 11: Wireless LAN Medium Access Control (MAC) and Physical Layer (PHY) Specifications." IEEE Std. 802.11, 1999 (R2003); 47 pages.

* cited by examiner

METHOD AND APPARATUS FOR PERFORMING A HANDOFF OF A DATA COMMUNICATION SESSION FROM ONE NETWORK TO ANOTHER NETWORK

CROSS-REFERENCE TO RELATED APPLICATIONS

This disclosure claims the benefit of U.S. Provisional Application No. 61/253,806, filed Oct. 21, 2009. This disclosure is related to U.S. patent application Ser. No. 11/542,396 filed on Oct. 3, 2006, and U.S. patent application Ser. No. 11/764,796 filed on Jun. 18, 2007. The disclosures of the above applications are incorporated herein by reference in their entirety.

FIELD

The present disclosure relates to wireless communication systems, and more particularly to handing off a link of a wireless device from one network to another network.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Use of mobile devices (e.g., cellular phones and personal digital assistants (PDAs)) having more than one wireless communication interface is proliferating. For example, a mobile device may have a cellular interface for communicating with a cellular network, and a wireless network interface for communicating with a wireless network. The wireless network interface may include, for example, a WiFi interface, a Bluetooth™ (BT) interface, and/or a Worldwide Interoperability for Microwave Access (WiMAX) interface.

SUMMARY

A mobile device comprises a first interface module, a second interface module, and a control module. The first interface module is configured to interface the mobile device to a first wireless network and to receive data from a transmitting device via the first wireless network. The second interface module is configured to interface the mobile device to a second wireless network. The control module is configured to determine based on the data received when to switch a link to the transmitting device from the first wireless network to the second wireless network. The control module is further configured to transmit a message that informs the transmitting device not to transmit the data to the mobile device via the first wireless network in response to the link being switched to the second wireless network.

In other features, the system described above is implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings.

DESCRIPTION

Figure 1:
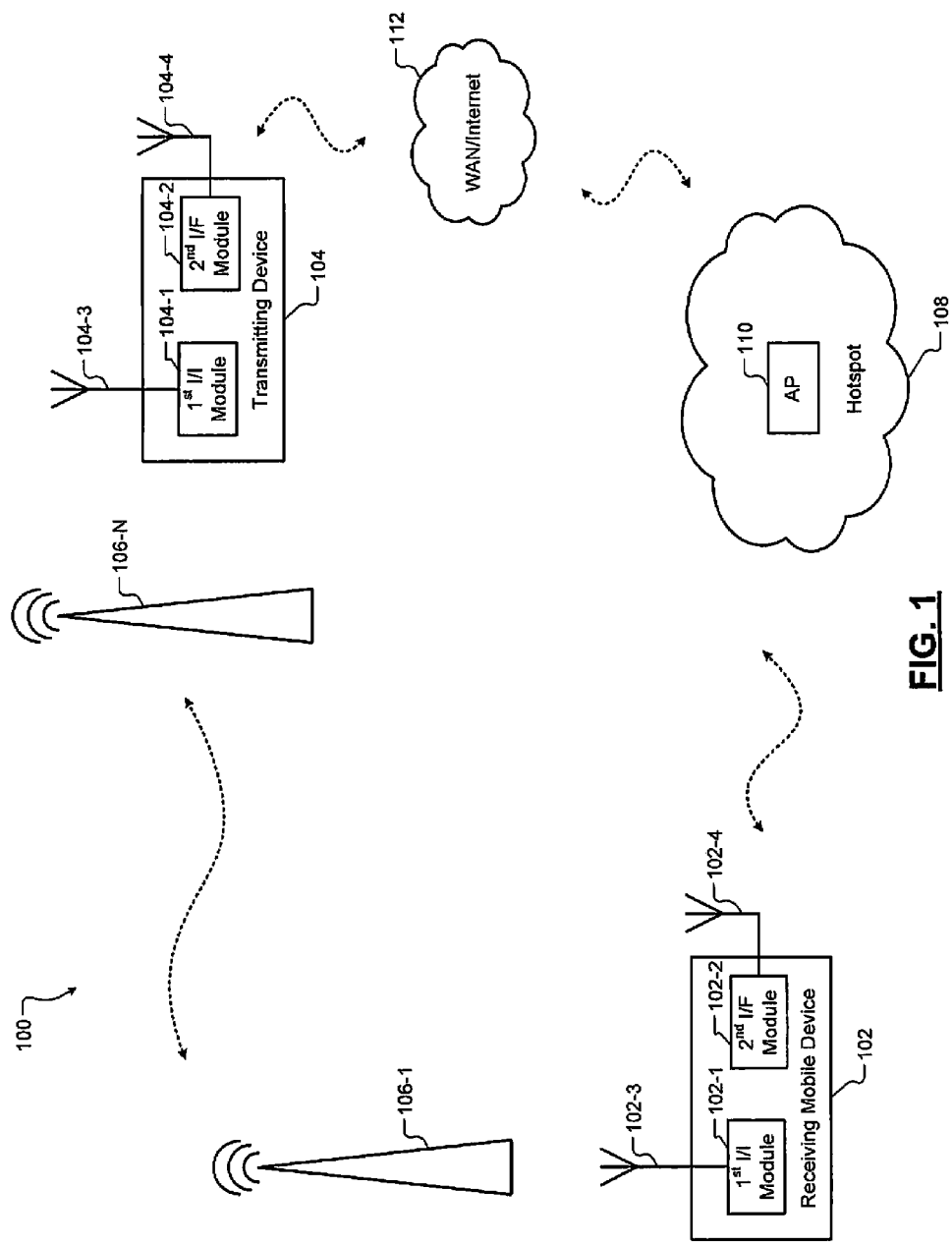
FIG. 1 is a schematic of a communication system comprising a receiving mobile device that communicates with a transmitting device according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Occasionally, a receiving wireless device (hereinafter receiver) may receive data comprising voice, video, and/or text from a transmitting wireless device (hereinafter transmitter). The receiver may be capable of receiving the data via more than one network. For example, the receiver may be capable of receiving the data via two or more of these networks: a cellular network, a Bluetooth® (BT) network, a WiFi network, and a Worldwide Interoperability for Microwave Access (WiMAX) network. Additionally, when the receiver is mobile, the receiver may roam out of one area serviced by one network and into another area serviced by another network. Accordingly, a communication link (hereinafter link) of the receiver may be switched from one wireless network to another. Switching the link of the receiver from one network to another is referred to as a "handoff".

For example, the receiver may receive the data via the cellular network when a user of the receiver is driving a vehicle. On reaching home or office, however, the user may prefer to receive the data via a WiFi network at home or office instead. Accordingly, a handoff of the link from the cellular network to the WiFi network may occur when the user reaches home or office. When the handoff occurs, the user may not experience loss of the data if the handoff is seamless.

The present disclosure relates to systems and methods for effectuating a seamless handoff when the link of the receiver is switched from one network to another. The receiver selects a network to use and determines when to switch the link to the selected network. Specifically, the receiver receives the data via a first network and a second network. A handoff may be anticipated based on movement of the receiver across the first and second networks. When the handoff is anticipated, the receiver selects the first or the second network to continue receiving the data. The receiver communicates the selection of the first or the second network to the transmitter that transmits the data to the receiver.

On receiving the selection, the transmitter continues to transmit the data to the receiver via the network selected by the receiver. Additionally, the transmitter stops transmitting the data to the receiver via the network that is not selected by the receiver. Thus, the handoff is completed seamlessly, that is, without loss of data at the receiver.

The receiver may determine which network to use and when to switch to the selected network using one or more criteria. For example only, the criteria may include network jitter and packet loss for each network. The receiver may determine network jitter and packet loss for each network as follows.

Typically, the transmitter includes time stamps and packet numbers in the packets when the transmitter transmits the packets via a network. When the packets are received via the first and second networks, the receiver can compare the time stamps of the packets received via the first and second networks and determine the network jitter for the first and second networks. An uneven network jitter in a network may indicate congestion in that network.

Additionally, the receiver can compare the packet numbers of the packets received via the first and second networks and determine packet loss for the first and second networks. For a network, when the network jitter is even and the packet loss is less than a threshold value, the receiver may determine that the link to that network is satisfactory. Accordingly, the receiver may determine not to switch the link.

Conversely, for a network to which the receiver is linked, when the network jitter is uneven and the packet loss is greater than the threshold value, the receiver may determine that the link to that network is unsatisfactory. Accordingly, the receiver may decide to switch the link from that network to another network having even network jitter and packet loss less than the threshold value.

In some implementations, the receiver may log the network jitter and the packet loss for the first and second networks. The receiver may use a sliding timing window to scan the network jitter and the packet loss logged over a period of time. The receiver may compare the network jitter and the packet loss of the first network to the network jitter and the packet loss of the second network over the period of time using the sliding timing window. Based on the comparison, the receiver may determine whether to switch the link from the first network to the second network or vice versa.

Occasionally, when the receiver is linked to the first network via a first link, the receiver may detect that some packets are missing (i.e., lost) in the data received via the first link. For example, the receiver may detect missing packets when packet numbers of the packets received are not in sequence or when some packet numbers are missing. The receiver may, however, find that the missing packets are received via the second network. In other words, the receiver may find that the packets received via the second network include the information missing due to lost packets. The receiver may merge or combine the information from the packets received via the second network with the data received via the first link.

Specifically, the receiver may utilize the packets received via the second network to fill the gaps due to the packets lost in the first link. Thus, the receiver may ensure that loss of data is not experienced at the receiver when the receiver is linked to the first network via the first link. Accordingly, the receiver may not switch the link of the receiver to the transmitter from the first network to the second network.

The receiver may decide to switch the link from the first network to the second network when data integrity of the data received via the second network matches the data integrity of the first network. One measure of data integrity is whether the time stamps of the packets received via the second network match the time stamps of the packets received via the first network. Matching time stamps indicate that the data is received synchronously and without packet loss (i.e., correctly) via the first and the second networks. Accordingly, when the time stamps of packets received via the first and second networks match, the receiver may switch the link from the first network to the second network. Specifically, the receiver may select the second network, inform the transmitter of the selection, and switch the link from the first network to the second network.

Alternatively, the receiver may decide to switch the link based on latency of the first and second networks. The receiver may measure latencies of the first and second networks based on the time stamps of the packets received via the first and second networks, respectively. The receiver may adjust the size of the jitter buffers associated with the first and second networks to match latencies of the first and second networks. The receiver may adjust the size of the jitter buffers based on the time stamps of the packets received via the first and second networks. Subsequently, the receiver may switch the link of the receiver from the first network to the second network.

Additionally, the receiver may use other criteria including types of data compression, codec, and frames used by the transmitter and the receiver when communicating via the first and second networks. For example, the first and second networks may use different data compression schemes, coding schemes, and/or frame configurations. Accordingly, when switching the link from the first network to the second network or vice versa, different decompression schemes, transcoding schemes, and/or frame conversion schemes may be utilized.

In some implementations, when the user of the receiver is mobile, the receiver may communicate with the cellular network via the cellular interface and may turn off the WiFi interface, for example. The receiver may turn on the WiFi interface when the receiver gets proximate to a WiFi hotspot. For example, while receiving data via the cellular network, the receiver may get proximate to a WiFi hotspot at home, office, or store that includes the WiFi hotspot. The receiver may turn on the WiFi interface and begin receiving data from the WiFi network at home, office, or store. Subsequently, a handoff of link from the cellular network to the WiFi network may occur in the manner described above.

FIG. 1 illustrates a communication system 100. The communication system 100 includes a receiving mobile device (receiver) 102 that receives data from a transmitting device (transmitter) 104 via a first network and a second network. For example only, the first network may include a cellular network or a WiMAX network, and the second network may include a WiFi network. The first network comprises a base station 106-1, . . . , and 106-N, where N is an integer greater than 1. The second network may comprise a WiFi hotspot 108 that includes an access point 110 with which the receiver 102 communicates. The second network may communicate with the transmitter 104 via a wide area network (WAN) and/or the Internet shown as WAN/Internet 112.

The receiver 102 comprises a first interface module 102-1 that interfaces the receiver 102 to the first network. Additionally, the receiver 102 comprises a second interface module 102-2 that interfaces the receiver 102 to the second network via the WiFi hotspot 108. Although only the first and second interface modules 102-1, 102-2 are shown, the receiver 102 may alternatively or additionally include other interface modules. The other interface modules may interface the receiver 102 to other types of networks. For example only, each of the first and second interface modules 102-1, 102-2 may include a cellular interface module, a WiFi interface module, a WiMAX interface module, or a BT interface module. The first interface module 102-1 may be different that the second interface module 102-2.

The first and second interface modules 102-1, 102-2 may communicate with the first and second networks via antennas 102-3 and 102-4, respectively. Although not shown, the first and second interface modules 102-1, 102-2 may communicate with the first and second networks via a combined antenna instead. In some implementations, the antennas 102-3, 102-4, and/or the combined antenna may include multiple-input multiple-output (MIMO) antennas.

The transmitter 104 comprises a first interface module 104-1 that interfaces the transmitter 104 to the first network. Additionally, the transmitter 104 comprises a second interface module 104-2 that interfaces the transmitter 104 to the second network via the WAN/Internet 112. Although only the first and second interface modules 104-1, 104-2 are shown, the transmitter 104 may alternatively or additionally include other interface modules. The other interface modules may interface the transmitter 104 to other types of networks. For example only, each of the first and second interface modules 104-1, 104-2 may include a cellular interface module, a WiFi interface module, a WiMAX interface module, or a BT interface module. The first interface module 104-1 may be different that the second interface module 104-2. Alternatively, in some implementations, the transmitter 104 may include a wireline interface (not shown) that interfaces the transmitter 104 to the WiFi network via the wireline interface.

The first and second interface modules 104-1, 104-2 may communicate with the first and second networks via antennas 104-3 and 104-4, respectively. Although not shown, the first and second interface modules 104-1, 104-2 may communicate with the first and second networks via a combined antenna instead. In some implementations, the antennas 104-3, 104-4, and/or the combined antenna may include multiple-input multiple-output (MIMO) antennas.

Figure 2:
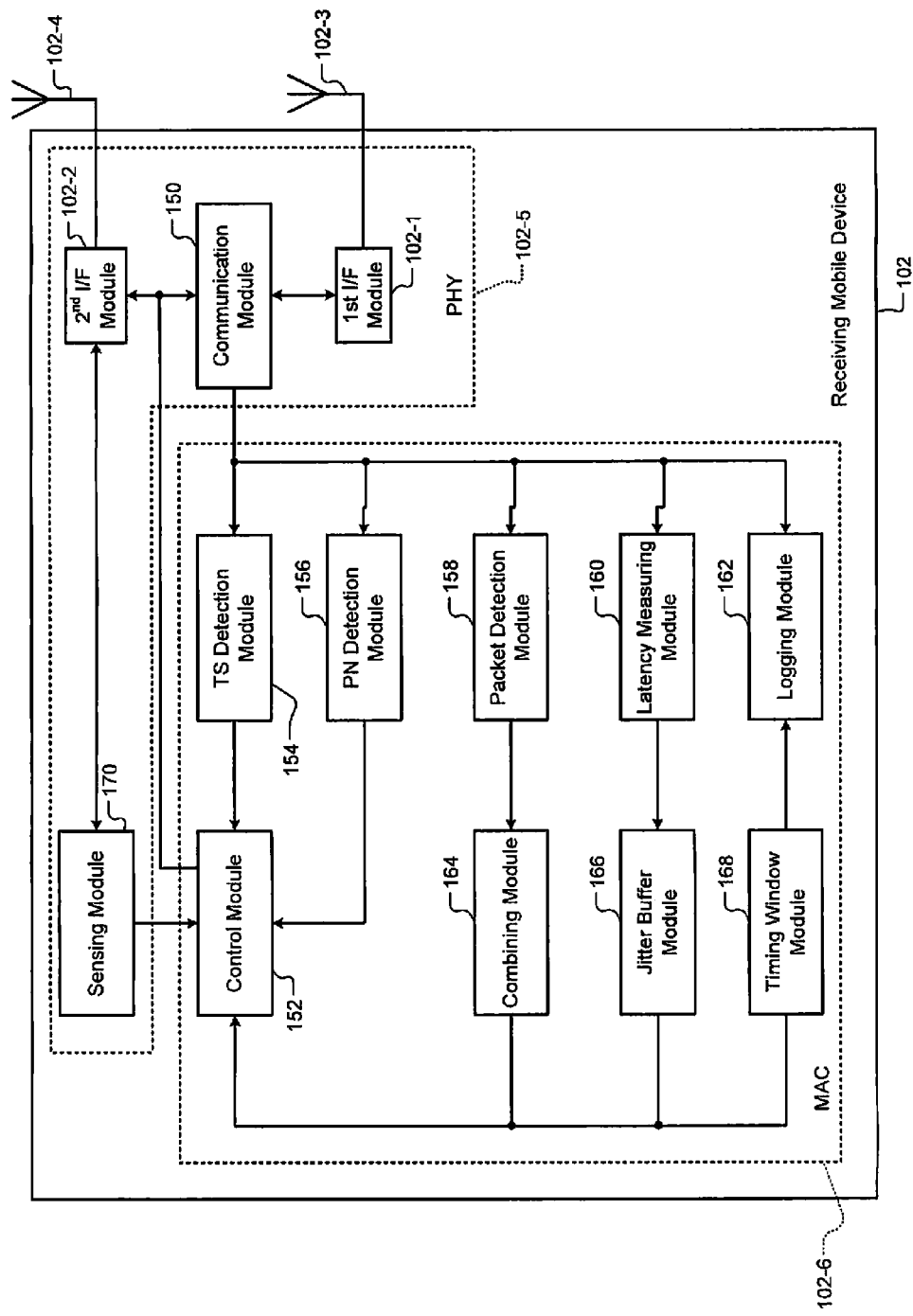
FIG. 2 is a functional block diagram of the receiving mobile device according to the present disclosure.

Referring now to FIG. 2, the receiver 102 may comprise a physical layer (PHY) 102-5 and a medium access controller (MAC) 102-6. The PHY 102-5 may comprise the first and second interface modules 102-1, 102-2, a communication module 150, and a sensing module 170. The MAC 102-6 may comprise a control module 152, a time stamp (TS) detection module 154, a packet number (PN) detection module 156, a packet detection module 158, a latency measuring module 160, a logging module 162, a combining module 164, a jitter buffer module 166, and a timing window module 168.

In some implementations, the modules may be arranged differently than shown. For example, one or more modules of the PHY 102-5 may be included in the MAC 102-6 and vice versa. The modules of the PHY 102-5 and/or the MAC 102-6 may be integrated into an integrated circuit (IC). The IC may be integrated with the PHY 102-5 and/or the MAC 102-6.

The communication module 150 communicates with the transmitter 104 via the first and second interface modules 102-1, 102-2. The communication module 150 receives data from the first and second networks via the first and second interface modules 102-1, 102-2, respectively. The communication module 150 transmits data received from the control module 152 to the first and second networks the first and second interface modules 102-1, 102-2, respectively.

For example only, the control module 152 may initially link the receiver 102 to the transmitter 104 via the first network using the first interface module 102-1. Accordingly, the receiver may receive data from the transmitter 104 via the first interface module 102-1. Subsequently, the sensing module 170 may sense when the receiver 102 is proximate to the second network. The control module 152 turns on the second interface module 102-2 when the second network is sensed. For example, when the second network includes the WiFi network, the control module 152 turns on the second interface module 102-2 when the WiFi hotspot 108 is sensed. The receiver 102 receives data from the transmitter 104 via the second interface module 102-2 in addition to receiving the same data via the first interface module 102-1.

The control module 152 determines whether to continue receiving the data from the transmitter 104 via the first network or to switch the link of the receiver 102 from the first network to the second network. The control module 152 determines whether to switch the link based on the data received from the first and second networks via the first and second interface modules 102-1, 102-2, respectively. Subsequently, the control module 152 determines when to switch the link of the receiver 102 to the transmitter 104 from the currently used network to the selected network. For example only, the control module 152 determines when to switch the link from the first network (e.g., the cellular network) to the second network (e.g., the WiFi network).

When the link is switched, the control module 152 transmits a message that informs the transmitter 104 not to transmit the data to the receiver 102 via the first network and to transmit the data to the receiver 102 via the second network instead. Accordingly, the transmitter 104 continues to transmit the data to the receiver 102 via the second network and stops transmitting the data to the receiver 102 via the first network. Thus, no data is lost when the link of the receiver 102 to the transmitter 104 is switched from the first network to the second network. In other words, the handoff of the link from the first network to the second network is seamless.

More specifically, the control module 152 determines which network to use and when to switch the link to seamlessly handoff the link from one network to another as follows. The TS detection module 154 detects time stamps of packets received via the first and second networks. The TS detection module 154 compares the time stamps of the packets received via the first network to the time stamps of the packets received via the second network. When the times stamps of the packets received via the two networks match, the TS detection module 154 determines that the data is being received via the two networks synchronously. Accordingly, the control module 152 switches the link from the first network to the second network when the time stamps match.

The PN detection module 156 detects packet numbers of a set of packets received via the first network. The PN detection module 156 detects packet numbers of a set of packets received via the second network. When the packet numbers of the two sets match, the PN detection module 156 determines that the data is being received via the two networks synchronously. Accordingly, the control module 152 switches the link from the first network to the second network when the packet numbers match.

Additionally, based on the packet numbers of the packets received, the packet detection module 158 detects whether any packets are missing in the data received via the first network. For example, the packet detection module 158 detects that packets are missing when the packet numbers are not in sequence. The packet detection module 158 detects whether the packets that are missing in the data received via the first network are present in the data received via the second network. In other words, the packet detection module 158 detects packets received via the second network that include the information lost due to the missing packets. The combining module 164 combines or merges the information from the packets received via the second network with the data received via the first network. Thus, the packet loss in the data received via the first network is compensated. Accordingly, the control module 152 decides not to switch the link of the receiver 102 to the transmitter 104 from the first network to the second network.

The jitter buffer module 166 includes jitter buffers that are associated with the first and second networks. The jitter buffer module 166 determines network jitter for the first and second networks based on the data received via the first and second networks, respectively. The jitter buffer module 166 determines network jitter based on the time stamps of the packets received via the first and second networks. The packet detection module 158 determines packet loss in the data received via the first and second networks. The packet detection module 158 determines packet loss based on the packet numbers of the packets received via the first and second networks.

The control module 152 decides not to switch the link from the first network to the second network when the network jitter of the first network is even and the packet loss of the first network is less than or equal to a predetermined threshold. Conversely, the control module 152 switches the link when the following occurs: The network jitter of the first network is uneven; the packet loss of the first network is greater than a predetermined threshold; the network jitter of the second network is even; and the packet loss of the second network is less than or equal to the predetermined threshold.

In some implementations, the logging module 162 logs network jitters and packet losses of the first and second networks. The timing window module 168 generates a sliding timing window. The control module 152 uses the sliding timing window to scan entries of the network jitters and packet losses logged over a predetermined time period. The control module 152 decides whether to switch the link based on the evenness of the network jitters and the threshold comparisons of the packet losses described above.

The latency measuring module 160 measures latencies of the first and second networks based on the time stamps. The jitter buffer module 166 adjusts a size of at least one of the jitter buffers based on the time stamps received via the first and second networks. The jitter buffer module 166 adjusts size until the latencies of the first and second networks match. The control module 152 switches the link of the receiver 102 from the first network to the second network when the latencies match of the two networks match.

Figure 3:
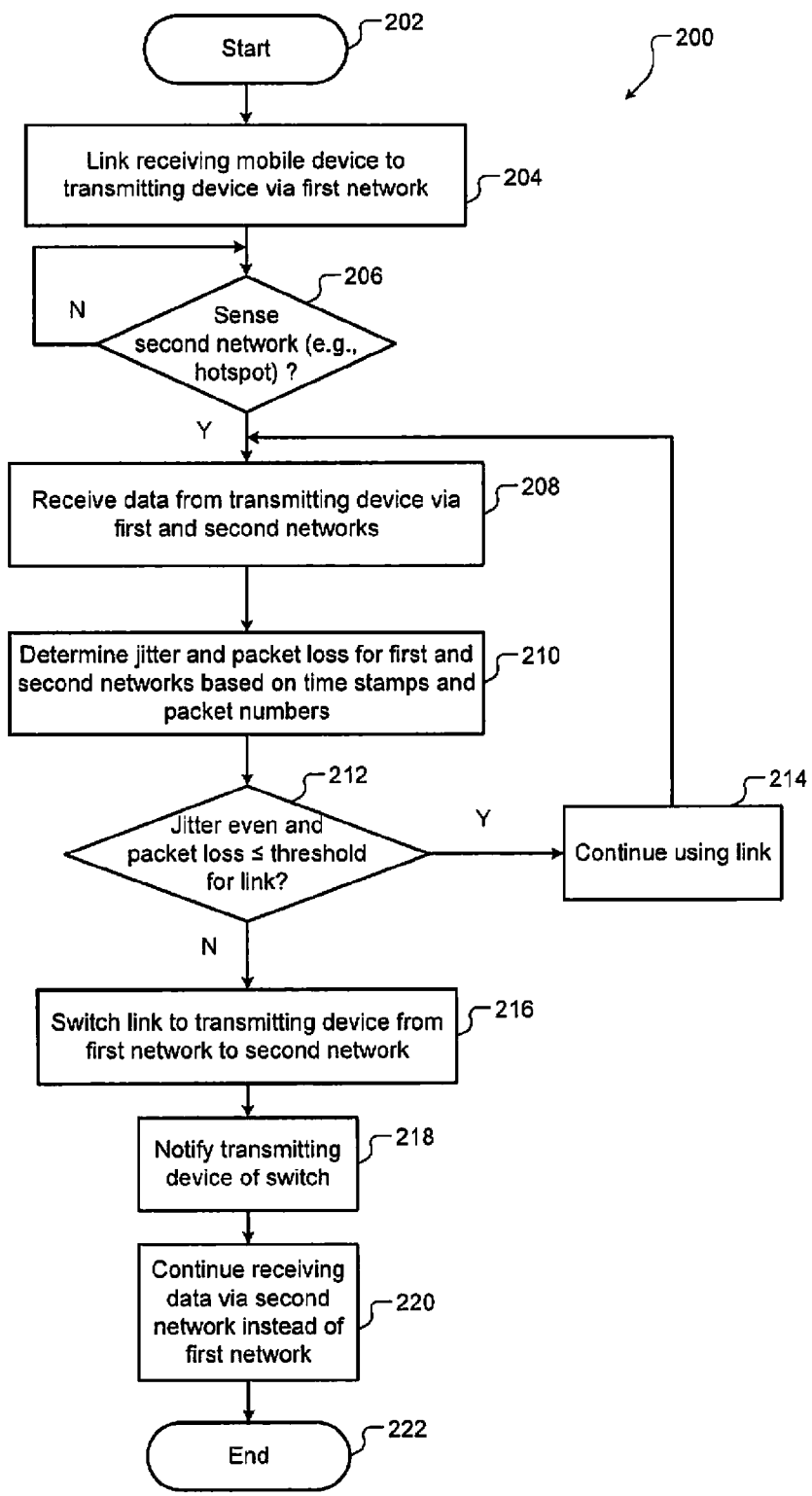
FIG. 3 is a flowchart of a method for performing a seamless handoff according to the present disclosure.

Referring now to FIG. 3, a method 200 for performing a seamless handoff according to the present disclosure is shown. Control begins in step 202. Control links the receiver to the transmitter via the first network in step 204. Control determines in step 206 whether the second network (e.g., the hotspot) is sensed. Control repeats step 206 when the result of step 206 is false. When the result of step 206 is true, control receives data from the transmitter via the first and second networks in step 208.

In step 210, control determines jitter and packet loss for the first and second networks based on time stamps and packet numbers of packets received from the first and second networks. Control determines in step 212 whether jitter for the first network is even and packet loss for the first network is less than or equal to the predetermined threshold. When the result of step 212 is true, control continues to receive data via the link in step 214, and control returns to step 208.

When the result of step 212 is false, control switches the link from the first network to the second network in step 216. Control, switches the link provided that jitter for the second network is even and packet loss for the second network is less than or equal to the predetermined threshold.

In step 218, control notifies the transmitter that the receiver switched the link from the first network to the second network so that the transmitter stops transmitting via the first network. Control continues to receive data from the transmitter via the second network in step 220. Control ends in step 222.

Figure 4:
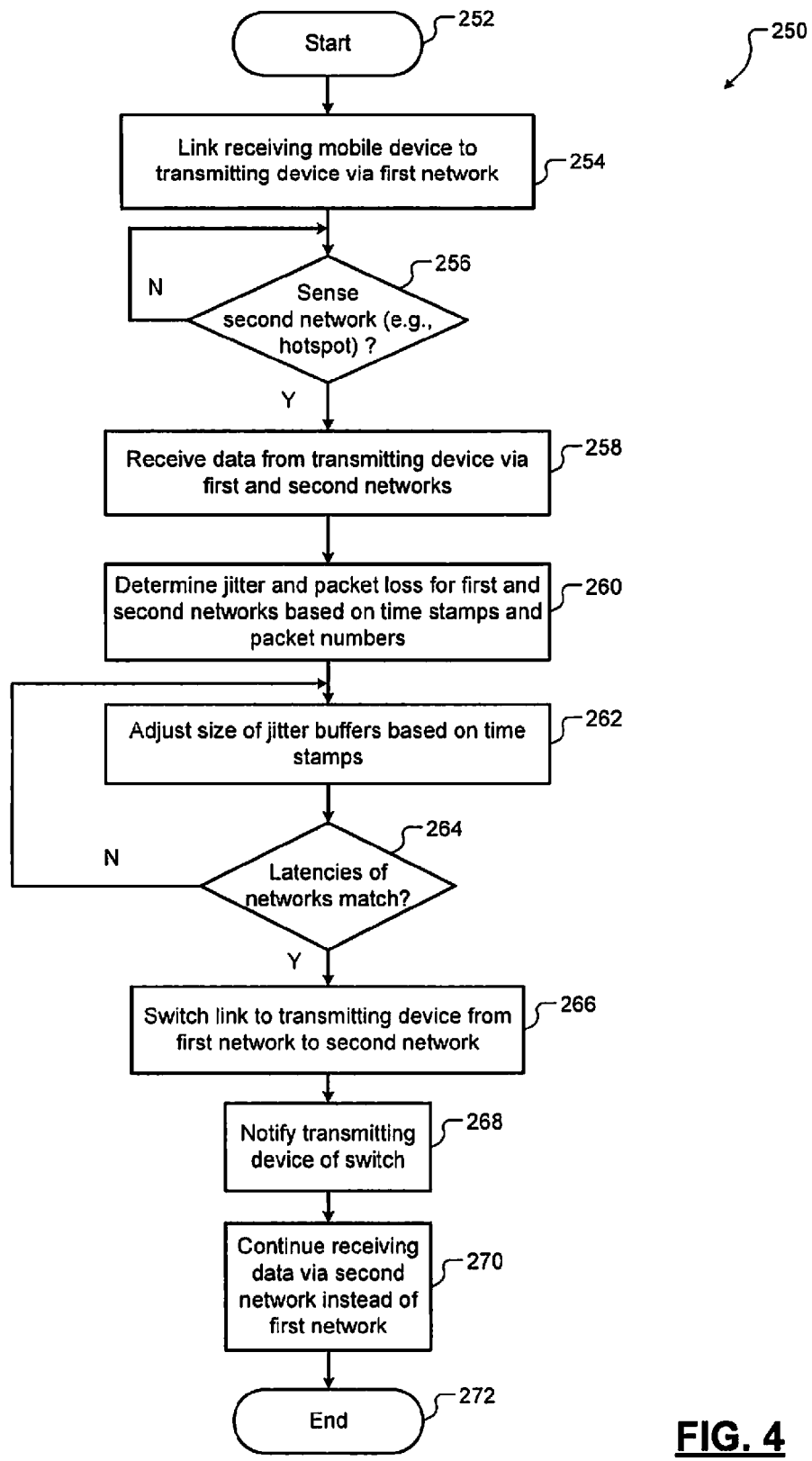
FIG. 4 is a flowchart of a method for performing a seamless handoff according to the present disclosure.

Referring now to FIG. 4, a method 250 for performing a seamless handoff according to the present disclosure is shown. Control begins in step 252. Control links the receiver to the transmitter via the first network in step 254. Control determines in step 256 whether the second network (e.g., the hotspot) is sensed. Control repeats step 256 when the result of step 256 is false. When the result of step 256 is true, control receives data from the transmitter via the first and second networks in step 258.

In step 260, control determines jitter and packet loss for the first and second networks based on time stamps and packet numbers of packets received from the first and second networks. In step 262, control adjusts size of jitter buffers for the first and second networks based on time stamps of packets received from the first and second networks.

In step 264, control determines whether latencies of the first and second networks match. Control repeats step 262 when the result of step 264 if false. Control switches the link from the first network to the second network in step 266 when the result of step 264 is true.

In step 268, control notifies the transmitter that the receiver switched the link from the first network to the second network so that the transmitter stops transmitting via the first network. Control continues to receive data from the transmitter via the second network in step 270. Control ends in step 272.

Figure 5:
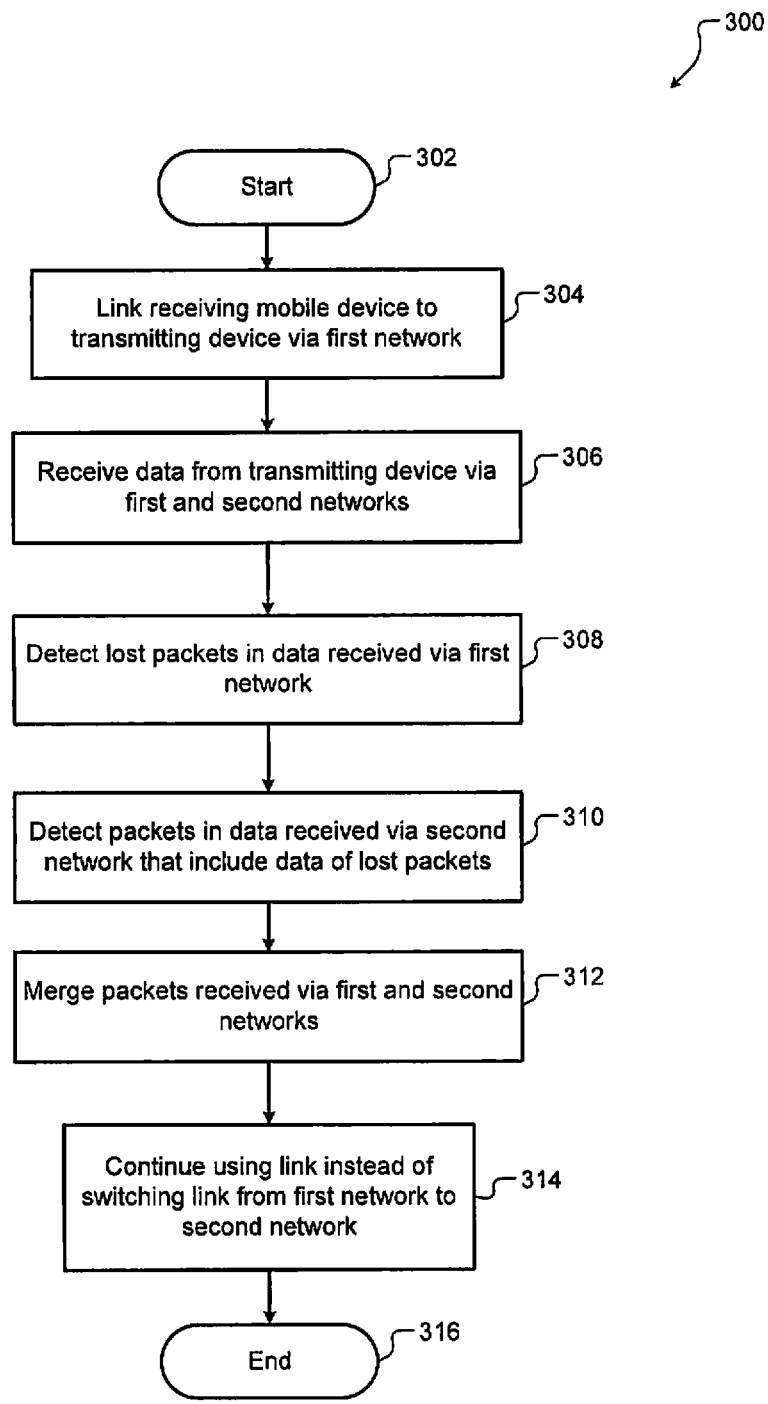
FIG. 5 is a flowchart of a method for compensating packet loss according to the present disclosure.

Referring now to FIG. 5, a method 300 for compensating packet loss according to the present disclosure is shown. Control begins in step 302. Control links the receiver to the transmitter via the first network in step 304. Control receives data from the transmitter via first and second networks in step 306.

In step 306, control detects lost packets in data received via the first network. In step 308, control detects packets in the data received via the second network, where the packets include information that is missing in the data received via the first network due to the lost packets.

In step 312, control uses the information from the packets received from the second network to fill gaps in the data received via the first network due to the lost packets. In step 214, control continues to receive data via the link instead of switching the link from the first network to the second network. Control ends in step 216.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A mobile device, comprising:
a first interface module configured to
  interface the mobile device to a cellular network, and
  receive, from a transmitting device, data transmitted over the cellular network to the mobile device, wherein the data originates at the transmitting device;

a second interface module configured to
  interface the mobile device to a wireless local area network, and
  receive, from the transmitting device, data transmitted over the wireless local area network to the mobile device, wherein the data transmitted over the wireless local area network corresponds to the data transmitted over the cellular network; and
a control module configured to
  compare (i) a first time stamp associated with the data received from the transmitting device over the cellular network to (ii) a second time stamp associated with the data received from the transmitting device over the wireless local area network,
  determine, based on the comparison of the first time stamp to the second time stamp, when the first time stamp matches the second time stamp,
  in response to a determination that the first time stamp matches the second time, switch a communication link to the transmitting device from the cellular network to the wireless local area network, and
  in response to, and subsequent to, the communication link to the transmitting device being switched from the cellular network to the wireless local area network, transmit a message to the transmitting device, wherein the message informs the transmitting device not to transmit the data to the mobile device over the network.

2. The mobile device of claim 1, wherein the data comprises at least one of voice, video, or text data.

3. The mobile device of claim 1, further comprising a time stamp detection module configured to:
  detect the first time stamp in a first packet received over the cellular network, wherein the data transmitted over the cellular network to the mobile device comprises the first packet; and
  detect the second time stamp in a second packet received over the wireless local area network, wherein the data transmitted over the wireless local area network to the mobile device comprises the second packet.

4. The mobile device of claim 3, further comprising:
a time stamp detection module configured to
  detect the first time stamp in the first packet received over the cellular network, wherein the data transmitted over the cellular network to the mobile device comprises the first packet, and
  detect the second time stamp in the second packet received over the wireless local area network, wherein the data transmitted over the wireless local area network to the mobile device comprises the second packet;
a latency measuring module configured to respectively measure a first latency and a second latency of the cellular network and the wireless local area network based on the first time stamp and the second time stamp; and
a jitter buffer module including a first jitter buffer and a second jitter buffer respectively associated with the cellular network and the wireless local area network, wherein the jitter buffer module is configured to adjust a size of at least one of the first jitter buffer and the second jitter buffer based on the first time stamp and the second time stamp, respectively, so that the first latency matches the second latency,
wherein the control module switches the communication link to the transmitting device from the cellular network to the wireless local area network in response to the first latency matching the second latency.

5. The mobile device of claim 1, further comprising a packet number detection module configured to:
  detect first packet numbers of a first set of packets received over the cellular network, wherein the data transmitted over the cellular network to the mobile device comprises the first set of packets, and
  detect second packet numbers of a second set of packets received over the wireless local area network, wherein the data transmitted over the wireless local area network to the mobile device comprises the second set of packets,
wherein the control module switches the communication link to the transmitting device from the cellular network to the wireless local area network in response to the first packet numbers matching the second packet numbers.

6. The mobile device of claim 1, further comprising:
a packet detection module configured to
  detect first packets missing in the data received over the cellular network, and
  detect second packets present in the data received over the wireless local area network, wherein the second packets include information contained in the first packets missing in the data received over the cellular network; and
a combining module configured to combine the information from the second packets with the data received over the cellular network.

7. The mobile device of claim 6, wherein the control module is configured to not switch the communication link to the transmitting device from the cellular network to the wireless local area network in response to the combining module combining the second packets with the data received via the cellular network.

8. The mobile device of claim 1, further comprising:
a jitter buffer module configured to determine network jitter based on the data received over the cellular network; and
a packet detection module configured to determine packet loss based on the data received over the cellular network,
wherein the control module does not switch the communication link to the transmitting device from the cellular network to the wireless local area network in response to (i) the network jitter being even and (ii) the packet loss being less than or equal to a predetermined threshold.

9. The mobile device of claim 1, further comprising:
a jitter buffer module configured to
  determine a first network jitter based on the data received over the cellular network, and
  determine a second network jitter based on the data received over the wireless local area network; and
a packet detection module configured to
  determine a first packet loss based on the data received over the cellular network,
  determine a second packet loss based on the data received over the wireless local area network,
wherein the control module switches the communication link to the transmitting device from the cellular network to the wireless local area network in response to (i) the first network jitter being uneven, (ii) the first packet loss being greater than a predetermined threshold, (iii) the second network jitter being even, and (iv) the second packet loss being less than or equal to the predetermined threshold.

10. The mobile device of claim 1, further comprising:
a logging module configured to log network jitter and packet loss rate based on the data received over the cellular network; and a timing window module configured to generate a timing window, wherein the control module scans entries of the network jitter and the packet loss logged over a predetermined time period using the timing window, and decides, based on the entries, whether to switch the communication link to the transmitting device from the cellular network to the wireless local area network.

11. The mobile device of claim 10, wherein the control module does not switch the communication link to the transmitting device from the cellular network to the wireless local area network in response to (i) the network jitter of the cellular network being even and (ii) the packet loss of the cellular network being less than or equal to a predetermined threshold.

12. The mobile device of claim 10, wherein the control module switches the communication link to the transmitting device from the cellular network to the wireless local area network in response to: (i) the network jitter of the cellular network being uneven, (ii) the packet loss of the cellular network being greater than a predetermined threshold, (iii) the network jitter of the wireless local area network being even, and (iv) the packet loss of the wireless local area network being less than or equal to the predetermined threshold.

* * * * *